Patented Nov. 9, 1926.

1,606,359

UNITED STATES PATENT OFFICE.

OTTO GERNGROSS, OF BERLIN-GRUNEWALD, AND KURT RÜLKE, OF CHARLOTTENBURG, GERMANY, ASSIGNORS TO THE FIRM OF RHENANIA VEREIN CHEMISCHER FABRIKEN AKTIENGESELLSCHAFT, OF AACHEN, GERMANY, A CORPORATION OF GERMANY.

DISINFECTANT, ANTISEPTIC, AND MEDICAMENT.

No Drawing. Application filed January 2, 1925, Serial No. 274, and in Germany January 26, 1924.

This invention is based on the recognition of the fact that thiocyanates, for instance potassium thiocyanate, which by themselves have only a slightly disinfecting action, are capable of considerably increasing the disinfectant, antiseptic and medicinal properties of heavy metal compounds, such as mercury, silver and the like, more particularly when the disinfectants or antiseptics are used in the presence of albumins, mucus, pus and the like.

For obtaining a disinfectant in accordance with the invention, corrosive sublimate (mercuric chloride) may for instance be brought into solution with suitable quantities of thiocyanate, barium thiocyanate or other thiocyanates. As corrosive sublimate with potassium thiocyanate and the like in solution is converted to complex salts, for instance of the composition $K_2Hg(CNS)_4$, an excess of thiocyanate must be used, i. e. it must be used in quantities exceeding those required for forming complex mercuric thiocyanogen compounds.

Instead of starting with corrosive sublimate it is possible first to produce mercuric thiocyanate or to start with ready made mercuric thiocyanate and then to bring it in contact with thiocyanate. The quantity of thiocyanogen compounds to be added may vary within wide limits and in certain circumstances may be very great relative to the amount of heavy metal salts. The quantities of alkali thiocyanates and the like to be added for obtaining the best results depend on the kind of heavy metal, on the concentration of the solutions, mixtures, ointments, salves or the like, on the purpose for which they are to be used and the like. When using the disinfectant in the presence of albumin the quantities of alkali thiocyanate and the like added will preferably be such that the greatest possible swelling and liquefying effect will be exerted on the albumin and allied substances.

For the manufacture of disinfectants containing silver salts, potassium silver cyanide may for instance be mixed with a corresponding quantity of thiocyanate. The use, however, of some complex silver salts, such as protargol and albargin is not recommended, as such salts are split up by thiocyanates.

For the manufacture of the products the primary substances may be introduced in solution, as described. Or mixtures may first be made of the primary substances to be used, such as potassium silver cyanide and potassium thiocyanate, containing the constituents in suitable quantities, and these mixtures converted into the particular forms required, such as solutions, suspensions, salves, pastes, sticks. The components may also be used one after another, for instance by rubbing up one of them with a salve as a base and then adding the others. Finally several heavy metal salts may be combined and the mixture activated by means of thiocyanogen compounds, or a plurality of thiocyanogen compounds may be combined with one or more heavy metal salts. In the disinfectants or medicaments, which may be made according to the invention, other active or inactive substances may be embodied, more particularly such as are commonly used in the manufacture of disinfectants and medicaments, such for instance as saponin and other substances having the property of reducing the surface tension, for instance dextrin, starch and the like. Activating thiocyanogen compounds are those of the like metals, more particularly those of the alkalis, including ammonium, and of the alkaline earths, including magnesium.

*Examples.*

(1) 1 part mercuric thiocyanate is mixed with 124 parts potassium thiocyanate. Use for instance in a 2½% solution.

(2) 1 part potassium silver cyanide is mixed with 99 parts potassium thiocyanate. Use for instance in a 3% solution.

(3) I part crystallized ferric chloride is mixed with 79 parts calcium thiocyanate. Use for instance in a 3% solution.

In all these combinations the presence of the thiocyanogen compounds has the effect of considerably increasing the effectiveness. Thus, for instance, the bactericidal property of mercuric thiocyanate is considerably increased by mixing that salt with potassium thiocyanate.

These agents have the further advantage that they develop only a very slight irritant action, so that they are eminently suitable for instance for use in forms, in which they come in contact with mucous membranes.

What we claim is:—

1. A disinfectant, antiseptic and medicament comprising a disinfectant heavy metal salt and a thiocyanogen compound having the effect of increasing the action of the said salt, as set forth.

2. A disinfectant, antiseptic and medicament comprising a plurality of disinfectant heavy metal salts and thiocyanogen compounds having the effect of increasing the disinfectant property of the same, as set forth.

3. A disinfectant, antiseptic and medicament comprising heavy metal thiocyanates and at least one thiocyanogen compound, as set forth.

4. A disinfectant, antiseptic and medicament comprising mercuric thiocyanate and a light metal thiocyanogen compound, as set forth.

5. A disinfectant, antiseptic and medicament comprising disinfectant heavy metal salts, thiocyanogen compounds having the effect of increasing the action of the said salts and other additions commonly used in the manufacture of disinfectants, as set forth.

6. A method of manufacturing a disinfectant, antiseptic and medicament, consisting in mixing heavy metal salts and thiocyanogen compounds in such proportions that the quantities of the said thiocyanogen compounds exceed the quantities required for forming complex heavy metal thiocyanogen compounds, as set forth.

7. A method of manufacturing a disinfectant, antiseptic and medicament, consisting in bringing heavy metal salts and thiocyanogen compounds into solution in such proportions that more thiocyanogen compounds are introduced than is required for forming complex heavy metal thiocyanates, as set forth.

In testimony whereof we have signed our names to this specification.

OTTO GERNGROSS.
KURT RÜLKE.